United States Patent
Sato et al.

(10) Patent No.: US 12,030,281 B2
(45) Date of Patent: Jul. 9, 2024

(54) METHOD FOR MANUFACTURING GLASS RESIN LAMINATED BODY

(71) Applicant: Nitto Denko Corporation, Ibaraki (JP)

(72) Inventors: Keisuke Sato, Osaka (JP); Takeshi Murashige, Osaka (JP); Junichi Inagaki, Osaka (JP); Atsushi Kishi, Osaka (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 17/598,357

(22) PCT Filed: Mar. 11, 2020

(86) PCT No.: PCT/JP2020/010552
§ 371 (c)(1),
(2) Date: Sep. 27, 2021

(87) PCT Pub. No.: WO2020/203124
PCT Pub. Date: Oct. 8, 2020

(65) Prior Publication Data
US 2022/0161524 A1    May 26, 2022

(30) Foreign Application Priority Data
Mar. 29, 2019   (JP) ................. 2019-066162

(51) Int. Cl.
*B32B 17/10*        (2006.01)
*B32B 37/00*        (2006.01)
(Continued)

(52) U.S. Cl.
CPC ........ *B32B 17/10862* (2013.01); *B32B 17/10* (2013.01); *B32B 17/10018* (2013.01); (Continued)

(58) Field of Classification Search
CPC ........ B32B 17/10862; B32B 17/10018; B32B 37/0007; B32B 37/0053; B32B 37/10;
(Continued)

(56) References Cited

U.S. PATENT DOCUMENTS

| 2008/0011411 A1 | 1/2008 | Fujita et al. |
| 2009/0142517 A1 | 6/2009 | Takeko et al. |

(Continued)

FOREIGN PATENT DOCUMENTS

| CN | 101104329 A | 1/2008 |
| CN | 101490587 A | 7/2009 |

(Continued)

OTHER PUBLICATIONS

International Search Report dated Jun. 9, 2020, issued in counterpart International application No. PCT/JP2020/010552, with English translation. (7 pages).

(Continued)

*Primary Examiner* — Francisco W Tschen
*Assistant Examiner* — Abhishek A Patwardhan
(74) *Attorney, Agent, or Firm* — WHDA, LLP

(57) ABSTRACT

A method of manufacturing a glass resin laminated body includes a step of sticking a glass film on a resin film via an adhesive layer while holding the glass film and the resin film between a first roller that presses against the resin film and a second roller that is disposed opposite to the first roller and that presses against the glass film. A ratio of an elastic modulus P1 of a surface layer of the first roller to an elastic modulus P2 of the resin film P1/P2 satisfies a relation of $3 \times 10^{-3} \leq P1/P2 \leq 1.0$.

3 Claims, 3 Drawing Sheets

(51) Int. Cl.
  *B32B 37/10* (2006.01)
  *B32B 37/12* (2006.01)
  *B32B 37/26* (2006.01)

(52) U.S. Cl.
  CPC ...... *B32B 37/0007* (2013.01); *B32B 37/0053* (2013.01); *B32B 37/10* (2013.01); *B32B 37/12* (2013.01); *B32B 37/26* (2013.01); *B32B 2037/268* (2013.01); *B32B 2250/05* (2013.01); *B32B 2307/42* (2013.01); *B32B 2457/20* (2013.01)

(58) Field of Classification Search
  CPC ... B32B 37/12; B32B 37/26; B32B 2037/268; B32B 2250/05; B32B 2307/42; B32B 2457/20
  See application file for complete search history.

(56) References Cited

U.S. PATENT DOCUMENTS

| | | | | |
|---|---|---|---|---|
| 2010/0192634 | A1* | 8/2010 | Higuchi | B29C 66/83413 65/60.1 |
| 2013/0129987 | A1* | 5/2013 | Mitsugi | B32B 17/10 428/192 |
| 2013/0202535 | A1* | 8/2013 | Choi | A61K 49/04 606/76 |
| 2014/0116618 | A1 | 5/2014 | Nakata et al. | |
| 2014/0357012 | A1* | 12/2014 | Toriyama | G02B 1/12 216/13 |
| 2015/0072125 | A1* | 3/2015 | Murashige | B32B 17/1055 156/60 |
| 2015/0146294 | A1 | 5/2015 | Watanabe | |
| 2015/0165749 | A1* | 6/2015 | Tamagaki | B65H 18/00 156/499 |
| 2016/0342254 | A1* | 11/2016 | Motohashi | G06F 3/041 |
| 2018/0203173 | A1* | 7/2018 | Murashige | C03C 17/32 |
| 2019/0055393 | A1 | 2/2019 | Tsuji et al. | |

FOREIGN PATENT DOCUMENTS

| | | | |
|---|---|---|---|
| CN | 103792610 A | 5/2014 | |
| CN | 103869398 A | 6/2014 | |
| CN | 104335086 A | 2/2015 | |
| CN | 108699266 A | 10/2018 | |
| JP | 55-090444 A | 7/1980 | |
| JP | 2002-348150 A | 12/2002 | |
| JP | 2006-309033 A | 11/2006 | |
| JP | 2006-317560 A | 11/2006 | |
| JP | 2006-328329 A | 12/2006 | |
| JP | 2006-328334 A | 12/2006 | |
| JP | 2006-337491 A | 12/2006 | |
| JP | 2006-337492 A | 12/2006 | |
| JP | 2006-337493 A | 12/2006 | |
| JP | 2006-337569 A | 12/2006 | |
| JP | 2007-009182 A | 1/2007 | |
| JP | 2009-161744 A | 7/2009 | |
| JP | 2010-284840 A | 12/2010 | |
| JP | 2012-073580 A | 4/2012 | |
| JP | 2013-014135 A | 1/2013 | |
| JP | 2013123833 A | 6/2013 | |
| JP | 2015-199878 A | 11/2015 | |
| JP | 2017-024177 A | 2/2017 | |
| TW | 201736137 A | 10/2017 | |
| WO | 2013/175767 A1 | 11/2013 | |
| WO | 2016/084703 A1 | 6/2016 | |
| WO | WO-2017010499 A1 * | 1/2017 | ............ B32B 17/06 |

OTHER PUBLICATIONS

Written Opinion dated Jun. 9, 2020, issued in counterpart International application No. PCT/JP2020/010552. (4 pages).

Extended (Supplementary) European Search Report dated Apr. 25, 2022, issued in counterpart EP Application No. 20783614.9. (6 pages).

Office Action dated Oct. 2, 2023, issued in counterpart TW application No. 109109612 with English translation. (8 pages).

Office Action dated Oct. 26, 2023, issued in counterpart TW application No. 109109612 with English translation. (8 pages).

Office Action dated Jan. 6, 2024, issued in CN Application No. 202080023694.4, with English translation. (17 pages).

* cited by examiner

METHOD FOR MANUFACTURING GLASS RESIN LAMINATED BODY

FIELD OF THE INVENTION

The disclosure relates to a method for manufacturing a glass resin laminated body.

BACKGROUND ART

In recent years, liquid crystal cells provided with touch sensor functions on screens have been used in a wide range of fields from mobile phones to information displays.

The liquid crystal cells include, for example, a display panel in which a film or glass with a sensor function is laminated on a polarizing plate, and a tempered glass referred to as a front plate is arranged on the outermost layer via an adhesive layer for filling a level difference of a surface of a sensor. Moreover, recently, liquid crystal panels referred to as in-cells in which touch sensors are incorporated in glass substrates of liquid crystal cells from a viewpoint of reduction of thickness or reduction of weight have appeared.

On the other hand, reduction of thickness of tempered glass has also advanced. However, the reduction of thickness of tempered glass is limited because when the thickness of the tempered glass is 300 μm or less, the tempered glass may perform self-destruction due to its compression stress. In view of the situation, an increase of hardness of the front plate has been studied using resins. However, sufficient hardness has not been actually obtained.

Thus, thin glass films have attracted attention as the front plates of liquid crystal cells. The glass film is laminated, for example, with a resin film containing a polarizing plate via an adhesive layer. The adhesive layer tends to become thinner according to the demand for reducing thicknesses of products, or the like.

RELATED ART DOCUMENT

Patent Literature

Patent document 1: WO 2013/175767

SUMMARY OF THE INVENTION

Problem to be Solved by the Invention

Incidentally, the lamination process of the glass film with the resin film is performed, for example, while being held by two rollers which is arranged so as to be adjacent to each other in the vertical direction. In this process, when a foreign substance adheres to a surface of the roller that comes in contact with the resin film, the glass film with high rigidity is almost undeformed, and the resin film with low rigidity is mainly deformed.

Accordingly, on the surface of the resin film of the side that comes in contact with the glass film, a roughness corresponding to a shape of the foreign substance may be formed, and air may enter a recessed portion, and thereby a bubble defect is generated. In particular, the smaller the thickness of the adhesive layer is, the greater the number of generated bubble defects is. In a product, a smaller number of bubble defects is preferable.

The present invention has been made in view of the above-described problem, and aims at providing a method of manufacturing a glass resin laminated body, in which when a glass film is laminated on a resin film via an adhesive layer, even in the case where the adhesive layer is thin, generation of bubble defects is suppressed.

Means for Solving the Problem

According to an aspect of the invention, a method of manufacturing a glass resin laminated body includes a step of sticking a glass film on a resin film via an adhesive layer while holding the glass film and the resin film between a first roller that presses against the resin film and a second roller that is disposed opposite to the first roller and presses against the glass film. A ratio of an elastic modulus P1 of a surface layer of the first roller to an elastic modulus P2 of the resin film P1/P2 satisfies a relation of $3\times10^{-3} \leq P1/P2 \leq 1.0$.

Effects of the Invention

According to the disclosure of the present application, a method of manufacturing a glass resin laminated body, in which when a glass film is laminated on a resin film via an adhesive layer, even in the case where the adhesive layer is thin, generation of bubble defects is suppressed, is provided.

MODE FOR CARRYING OUT THE INVENTION

Figure 1:
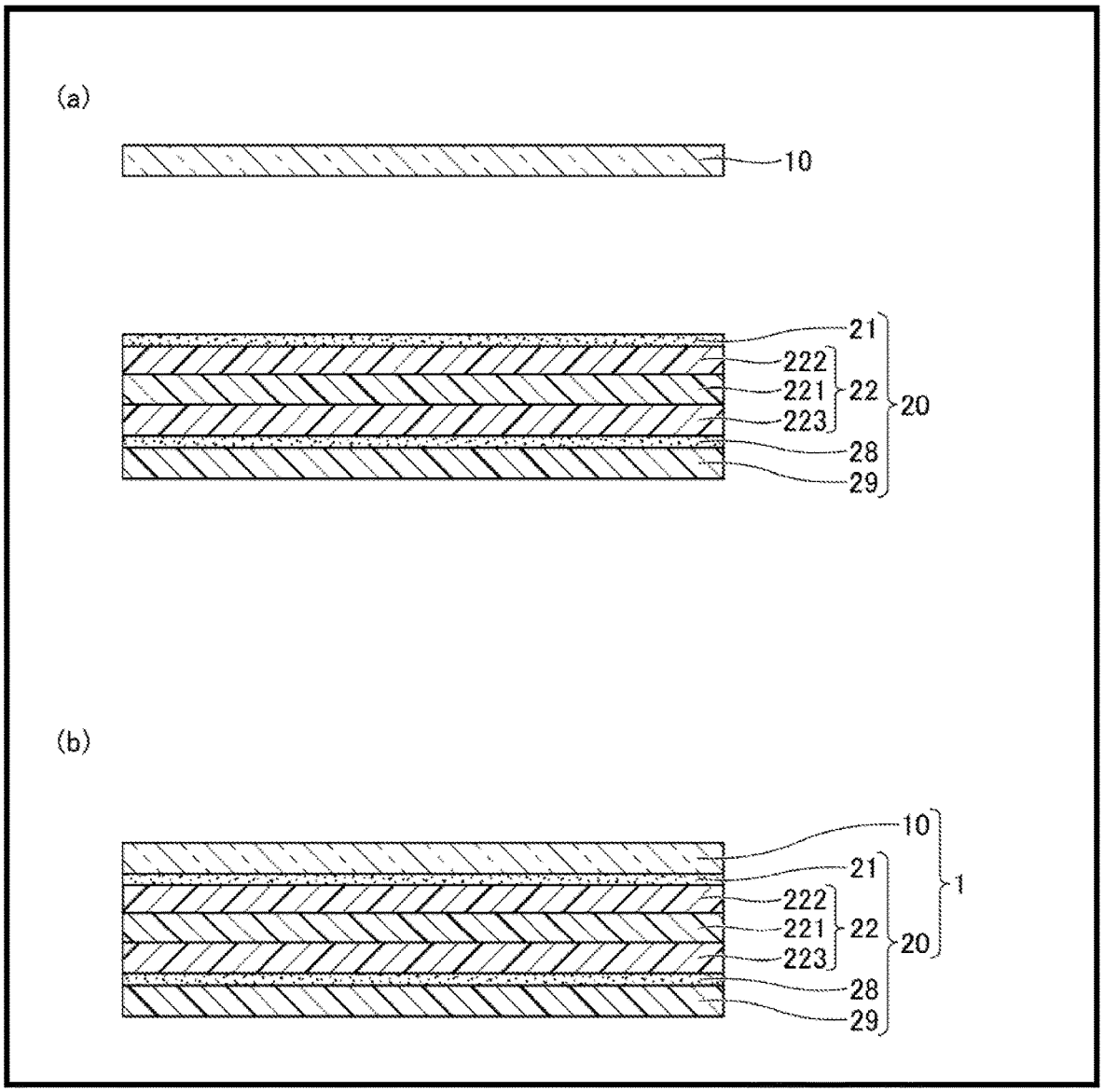
FIG. 1 is a cross-sectional view illustrating an example of a glass resin laminated body.

In the following, an embodiment for carrying out the present invention will be described with reference to the drawings. In each drawing, the same reference numeral is assigned to the same component, and an overlapping description may be omitted.

(Glass Resin Laminated Body)

The glass resin laminated body to be manufactured will be described. FIG. 1 is a cross-sectional view illustrating an example of the glass resin laminated body according to the embodiment. FIG. 1(a) shows a glass film and a resin film before lamination, and FIG. 1(b) shows the glass film and the resin film after lamination (i.e. the glass resin laminated body).

The glass resin laminated body 1 includes the glass film 10 and the resin film 20. The glass film 10 is stuck on the resin film 20 via an adhesive layer 21 of the resin film 20.

The glass film 10 is not particularly limited, and an appropriate material may be selected according to the purpose. According to the classification regarding the composition, the glass film 10 includes, for example, soda lime glass, borate glass, aluminosilicate glass, and quartz glass. Moreover, according to the classification regarding the alkaline component, the glass film 10 includes, for example, alkali-free glass and low alkali glass. The content of the alkaline metal component of the above-described glass (e.g. $Na_2O$, $K_2O$, $Li_2O$) is preferably 15 wt. % or less, and more preferably 10 wt. % or less.

The thickness of the glass film 10 is preferably within a range from 50 μm to 150 μm, more preferably within a range from 60 μm to 140 μm, further preferably within a range from 70 μm to 130 μm, and especially preferably within a range from 80 μm to 120 μm. When the thickness is within the above-described ranges, the glass resin laminated body 1 which is excellent in flexibility, possible to be processed by a roll-to-roll process, and excellent in productivity according to the robustness of the glass film is obtained.

The light transmittance of the glass film 10 at the wavelength of 550 nm is preferably 85% or more. The refractive index of the glass film 10 at the wavelength of 550 nm is preferably within a range from 1.4 to 1.65.

The density of the glass film 10 is preferably within a range from 2.3 g/cm$^3$ to 3.0 g/cm$^3$, and more preferably within a range from 2.3 g/cm$^3$ to 2.7 g/cm$^3$. When the density is within the above-described ranges, it is possible to provide the glass resin laminated body 1 which can contribute to the reduction of the weight of the image display device.

The molding method of the glass film 10 is not particularly limited, and an appropriate method can be selected according to the purpose. Typically, the glass film 10 can be prepared by melting a mixture containing a main raw material such as silica or alumina, a defoaming agent such as mirabilite or antimony oxide, and a reducing agent such as carbon, at a temperature within a range from 1400° C. to 1600° C., forming into a shape of a sheet, and cooling the mixture. Suitable methods of the glass film 10 may include, for example, a slot down draw method, a fusion method, and a float method. The glass film formed into a plate shape according to the above-described method, may be chemically polished with a solvent such as fluoric acid, as necessary, in order to make thinner or enhance the smoothness.

The resin film 20 includes the adhesive layer 21, a polarizing plate 22, a gluing agent layer 28, and a release film 29, in this order. The resin film 20 may further include other layers. For example, the resin film 20 may include a phase difference layer between the polarizing plate 22 and the gluing agent layer 28. However, the present invention is not limited to this.

The adhesive layer 21 may be provided on the glass film 10. In this case, the resin film 20 includes the polarizing plate 22, the gluing agent layer 28, and the release film 29, in this order, and other layers as necessary.

The elastic modulus of the resin film 20 is preferably within a range from 0.1 GPa to 8.0 GPa, more preferably within a range from 0.2 GPa to 7.0 GPa, and further preferably within a range from 0.3 GPa to 5.0 GPa. In the specification of the present disclosure, the elastic modulus can be measured under the following conditions.

[Elastic Modulus Measurement Method]
Measurement temperature is 23° C.
Sample size is 2 cm in width and 15 cm in length.
Distance between chucks is 10 cm.
Tensile speed is 10 mm/min.

In the specification of the present application, the gluing agent layer refers to a layer that has adhesiveness at a room temperature, and can adhere to an adherend member with a light pressure. Accordingly, when the adherend member adhered to the gluing agent layer is peeled off from the gluing agent layer, the gluing agent layer retains a practical adhesive strength. On the other hand, the adhesive layer refers to a layer that sticks two layers together. Thus, when an adherend member adhered to the adhesive layer is peeled off, the adhesive layer does not have a practical adhesive strength.

The polarizing plate 22 is disposed on an opposite side of the adhesive layer 21 to the glass film 10. The polarizing plate 22 has a polarizer 221, a first protection film 222, and a second protection film 223. The first protection film 222 is disposed on a side of the adhesive layer 21, and the second protection film 223 is disposed on a side of the gluing agent layer 28.

The release film 29 is deposited on an opposite side of the second protection film 223 to the polarizer 221 via the gluing agent layer 28.

In the following, each component of the resin film 20 will be further described in detail.

[Adhesive Layer]

The adhesive layer 21 is not particularly limited, and an appropriate adhesive may be used according to the purpose. Suitable adhesives may include, for example, polyester-based adhesives, polyurethane-based adhesives, polyvinyl alcohol-based adhesives, and epoxy-based adhesives. Among the above described adhesives, an epoxy-based adhesive having particularly excellent adhesiveness is preferable.

When the adhesive layer 21 includes a thermosetting adhesive, a peel resistance is exhibited by being heated. Moreover, when the adhesive layer 21 includes a photocurable adhesive such as an ultra-violet curable type adhesive, the peel resistance is exhibited by being irradiated with light such as ultra-violet light. In addition, when the adhesive layer 21 includes a moisture-curable adhesive, the adhesive layer can be cured according to the reaction with moisture or the like in the air. Thus, the peel resistance is exhibited also by being left as it is.

For the adhesive layer 21, for example, a commercially available adhesive may be used. Various curable resins may be dissolved or dispersed in a solvent so as to be prepared as an adhesive solution or a dispersion.

The thickness of the adhesive layer 21 is preferably less than or equal to 8 μm, more preferably within a range from 0.1 μm to 8 μm, further preferably within a range from 0.1 μm to 5 μm, and especially preferably within a range from 0.1 μm to 2 μm. When the thickness is within the above-described ranges, it is possible to obtain the glass resin laminated body 1 which is excellent in flexibility and excellent in stick resistance. Moreover, because as the thickness of the adhesive layer 21 decreases, the thickness of the glass resin laminated body 1 also decreases, it is possible to meet the demand for thinning products.

The elastic modulus of the adhesive layer 21 is preferably within a range from 0.5 GPa to 15 GPa, more preferably within a range from 0.8 GPa to 10 GPa, and further preferably within a range from 1 GPa to 5 GPa. When the elastic modulus is within the above-described ranges, it is possible to obtain the glass resin laminated body 1 which is excellent in flexibility and excellent in stick resistance.

In the state shown in FIG. 1(*a*) (before lamination), the adhesive layer 21 is uncured. After the glass film 10 is laminated on the resin film 20 as shown in FIG. 1(*b*), the adhesive layer 21 is cured. Thus, the glass resin laminated body 1 in which the glass film 10 is stuck on the resin film 20 is obtained. The method of manufacturing the glass resin laminated body 1 in which the glass film 10 is stuck on the resin film 20 via the adhesive layer 21 will be described later.

[Polarizing Plate]

The thickness of the polarizing plate 22 is preferably within a range from 5 μm to 300 μm, more preferably within a range from 10 μm to 250 μm, further preferably within a range from 25 μm to 200 μm, and especially preferably within a range from 25 μm to 100 μm.

The elastic modulus of the polarizing plate 22 is preferably greater than or equal to 1 GPa, more preferably within a range from 1 GPa to 10 GPa, further preferably within a range from 2 GPa to 7 GPa, and especially preferably within a range from 2 GPa to 5 GPa. When the elastic modulus is within the above-described ranges, it is possible to obtain the glass resin laminated body 1 that is excellent in stick resistance.

The shape of the polarizing plate 22 is not particularly limited, and an appropriate shape may be selected according to the purpose. For example, the shape includes a rectangular shape having a longer side and a shorter side. When the polarizing plate 22 has a rectangular shape, the absorption axis direction of the polarizer 221 of the polarizing plate 22 is preferably substantially parallel to the longer side or the shorter side of the polarizing plate 22. In the specification of the present application, the term "substantially parallel" is a concept including not only the case of strictly being parallel but also the case where the angle formed by two lines are ±10° (preferably ±5°).

[Polarizer]

The thickness of the polarizer 221 is not particularly limited, and an appropriate thickness may be selected according to the purpose. Typically, the thickness of the polarizer 221 is about within a range from 1 μm to 80 μm. A thin polarizer may be used for the polarizer 221. In this case, the thickness of the polarizer 221 is preferably less than or equal to 20 μm, more preferably less than or equal to 15 μm, further preferably less than or equal to 10 μm, and especially preferably less than or equal to 6 μm.

The polarizer 221 preferably exhibits absorption dichroism at any wavelength within the range from 380 nm to 780 nm. The single body transmittance of the polarizer 221 is preferably greater than or equal to 40.0%, more preferably greater than or equal to 41.0%, further preferably greater than or equal to 42.0%, and especially preferably greater than or equal to 43.0%. The polarization degree of the polarizer 221 is preferably greater than or equal to 99.8%, more preferably greater than or equal to 99.9%, and further preferably greater than or equal to 99.95%.

The polarizer 221 is preferably an iodine-based polarizer. More specifically, the above-described polarizer can be configured by a polyvinyl alcohol-based resin (hereinafter, referred to as a "PVA-based resin") film containing iodine.

The PVA resin forming the PVA-based resin film is not particularly limited, and an appropriate resin may be selected according to the purpose. Suitable PVA resins may include, for example, polyvinyl alcohol or ethylene-vinyl alcohol copolymer.

Polyvinyl alcohol is obtained by saponifying polyvinyl acetate. Ethylene-vinyl alcohol copolymer is obtained by saponifying ethylene-vinyl acetate copolymer. The saponification degree of the PVA-based resin is typically within a range from 85 mol % to 100 mol %, preferably within a range from 95.0 mol % to 99.95 mol %, and further preferably within a range from 99.0 mol % to 99.93 mol %. The saponification degree is determined in accordance with JIS K 6726-1994. By using the PVA-based resin with the above-described saponification degree, it is possible to obtain the polarizer excellent in durability. If the saponification degree is too high, the resin may be gelated.

The average degree of polymerization of the PVA-based resin is not particularly limited, and can be appropriately selected according to the purpose. The average degree of polymerization of the PVA-based resin is, for example, within a range from 1000 to 10000, preferably within a range from 1200 to 5000, and further preferably within a range from 1500 to 4500. The average degree of polymerization is determined in accordance with JIS K 6726-1994.

The method of manufacturing the polarizer 221 includes, for example, a method of stretching and dyeing a PVA-based resin film alone (I), and a method of stretching and dyeing a laminated body (i) having a resin substrate and a polyvinyl alcohol-based resin layer (II). The method (I) is a well-known method in the art, and will not be described in detail.

The method (II) preferably includes a step of stretching and dyeing the laminated body (i) having a resin substrate and a polyvinyl alcohol-based resin layer formed on one side of the resin substrate to prepare a polarizer on the resin substrate. The laminated body (i) can be formed by applying an application liquid containing the polyvinyl alcohol-based resin on the resin substrate and drying the liquid. Moreover, the laminated body (i) may also be formed by transferring a polyvinyl alcohol-based resin layer onto the resin substrate. Details of the above-described method (II) are disclosed in, for example, Japanese unexamined patent application publication No. 2012-73580, which can be incorporated in the specification by reference.

[First and Second Protection Films]

The first protection film 222 and the second protection film 223 are not particularly limited, and an appropriate resin film may be used according to the purpose. Suitable formation materials of the first protection film 222 and the second protection film 223 may include, for example, a polyester-based resin, such as polyethylene terephthalate (PET); a cellulosic resin, such as triacetyl cellulose (TAC); a cycloolefin-based resin, such as a norbornene-based resin; an olefin-based resin, such as polyethylene and polypropylene; and a (meth) acrylic resin. Among them, polyethylene terephthalate (PET) is preferable. In addition, "(meth) acrylic resin" refers to an acrylic resin and/or a methacrylic resin.

For the (meth) acrylic resin, for example, a (meth) acrylic resin having a glutarimide structure is used. The (meth) acrylic resin having a glutarimide structure (in the following, also referred to as a glutarimide resin) is disclosed, for example, in Japanese unexamined patent application publication No. 2006-309033, Japanese unexamined patent application publication No. 2006-317560, Japanese unexamined patent application publication No. 2006-328329, Japanese unexamined patent application publication No. 2006-328334, Japanese unexamined patent application publication No. 2006-337491, Japanese unexamined patent application publication No. 2006-337492, Japanese unexamined patent application publication No. 2006-337493, Japanese unexamined patent application publication No. 2006-337569, Japanese unexamined patent application publication No. 2007-009182, Japanese unexamined patent application publication No. 2009-161744, and Japanese unexamined patent application publication No. 2010-284840. These descriptions can be incorporated in the specification as references.

The first protection film 222, the second protection film 223, and the polarizer 221 can be laminated via any appropriate adhesive layer. The resin substrate used in the preparation of the polarizer 221 is peeled off before or after laminating the first protection film 222, the second protection film 223, and the polarizer 221.

The thicknesses of the first protection film 222 and the second protection film 223 are preferably within a range from 4 μm to 250 μm, more preferably within a range from 5 μm to 150 μm, further preferably within a range from 10 μm to 100 μm, and especially preferably within a range from 10 μm to 50 μm.

The elastic moduli of the first protection film 222 and the second protection film 223 are greater than or equal to 1

GPa, preferably within a range from 1 GPa to 10 GPa, more preferably within a range from 1.8 GPa to 7 GPa, and further preferably within a range from 2 GPa to 5 GPa. When the elastic moduli are within the above-described ranges, the glass resin laminated body 1 which is excellent in stick resistance can be obtained.

[Gluing Agent Layer]

The gluing agent layer 28 is formed of any appropriate gluing agent. For the gluing agent, for example, a gluing agent in which an acrylic polymer, a silicone-based polymer, polyester, polyurethane, polyamide, polyether, a fluorine-based polymer or a rubber-based polymer is used as a base polymer is used. Among them, an acrylic gluing agent is preferably used, because the acrylic gluing agent has excellent optical transparency, and exhibits an appropriate gluing characteristic of wettability, cohesiveness, and adhesiveness, and thereby is excellent in weather resistance and heat resistance. An acrylic gluing agent containing an acrylic polymer having 4 to 12 carbon atoms is especially preferable.

The thickness of the gluing agent layer 28 is preferably within a range from 1 μm to 100 μm, more preferably within a range from 3 μm to 80 μm, and further preferably within a range from 3 μm to 50 μm. In the case where the thickness is within the above-described ranges, when the glass resin laminated body 1 is attached to an optical element such as a liquid crystal cell to prepare an optical laminated body, an optical laminated body excellent in flexibility and stick resistance is obtained.

[Release Film]

The release film 29 can be formed of a resin such as polyethylene terephthalate (PET), polyethylene (PE), polypropylene (PP), or the like. The thickness of the release film 29 is preferably within a range from 5 μm to 125 μm, more preferably within a range from 20 μm to 75 μm, and further preferably within a range from 30 μm to 50 μm. The release film 29 is peeled off at an interface with the gluing agent layer 28, before the glass resin laminated body 1 is stuck on the optical element such as a liquid crystal cell.

(Method of Manufacturing Glass Resin Laminated Body)

Next, the method of manufacturing the glass resin laminated body will be described, focusing on a step of sticking the glass film 10 on the resin film 20 via the adhesive layer 21 held between a roller for pressing against the resin film 20 and a roller for pressing against the glass film 10.

Figure 2:
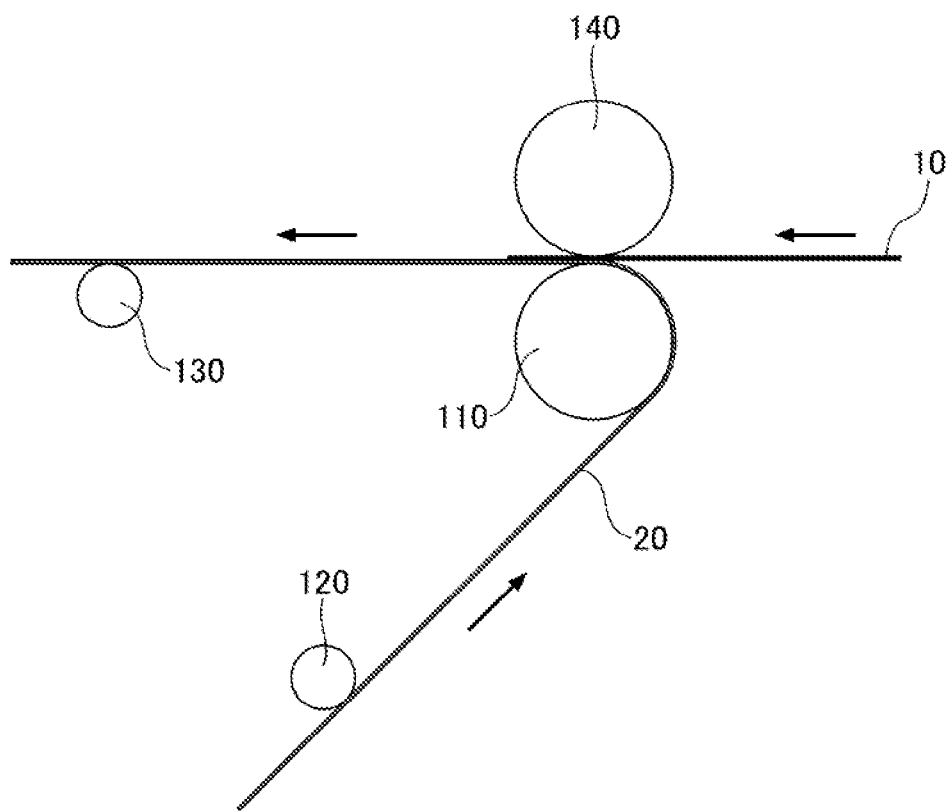
FIG. 2 is a diagram for explaining a process of laminating a glass film on a resin film.

FIG. 2 is a diagram for explaining a process of laminating a glass film on a resin film. In FIG. 2, the resin film 20 is suspended by rollers 110, 120, and 130 and conveyed in a direction indicated by the arrow. The resin film 20 is conveyed, for example, by a roll-to-roll method. A roller 140 is disposed at a position facing the roller 110 in the vertical direction.

FIG. 2 illustrates three rollers for conveying the resin film 20. This configuration is an example, and the number of rollers can be appropriately determined as necessary.

The glass film 10 is conveyed in the direction of the arrow and laminated on the resin film 20 between the roller 110 and the roller 140. Then, the roller 140 presses against the glass film 10, and the roller 110 presses against the resin film 20.

Thus, the glass film 10 is laminated on the resin film 20. At this stage, the adhesive layer 21 is uncured. The adhesive layer 21 is cured in a curing step, which is not shown, at a position on the downstream side of the rollers 110 and 140 in the conveyance direction (arrow direction), and thereby the glass resin laminated body 1 is completed. The thickness of the adhesive layer 21 is the same before and after the curing.

Figure 3:
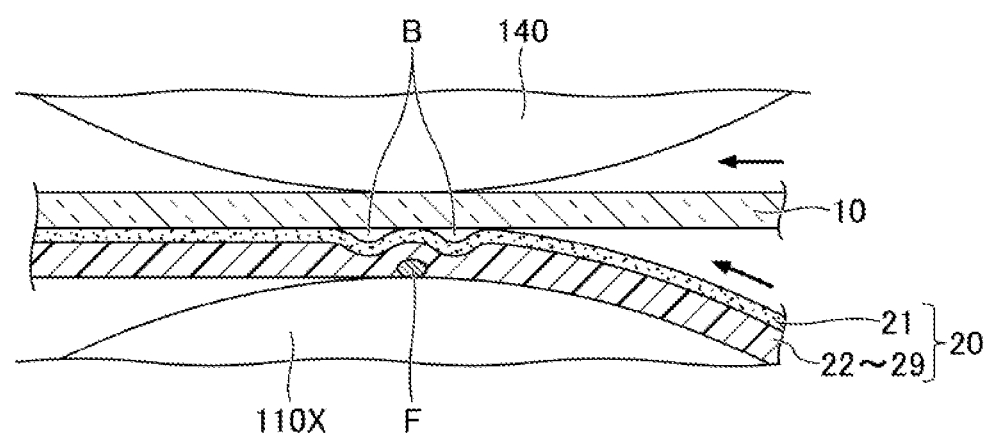
FIG. 3 is a diagram for explaining a problem in the related art when the glass film is laminated on the resin film.

In the following, the problem that may occur in the process of laminating the glass film 10 on the resin film 20, when the conventional method is used, will be described. FIG. 3 is a diagram for explaining the problem of the conventional method when the glass film is laminated on the resin film.

In FIG. 3, a roller 110X is used instead of the roller 110 shown in FIG. 2. The roller 110X is made of iron. That is, in the roller 110X, a portion corresponding to a surface layer of the roller 110 is formed of iron.

As shown in FIG. 3, a foreign substance F may adhere to the roller 110X. In this case, when the glass film 10 is laminated on the resin film 20, the resin film 20 on the roller 110X side contacts the foreign substance F. Then, the iron roller 110X and the glass film 10, which are highly rigid, are unlikely to be deformed, and mainly the resin film 20 with low rigidity is deformed. Thus, on the side of the resin film 20 contacting the glass film 10, a roughness corresponding to a shape of the foreign substance F may be formed, and air may enter a recessed portion, and thereby a bubble defect B may be generated.

The size of the bubble defect B is large enough to be visible. Thus, when the glass resin laminated body 1 is used in a product such as a display device, a predetermined number or more of the bubble defects B are not allowed, and preferably the bubble defect B is not present, if possible. Means for solving the problem in the related art, i.e. suppressing the generation of the bubble defect B in the embodiment of the present application will be described with reference to FIG. 4 and FIG. 5.

Figure 4:
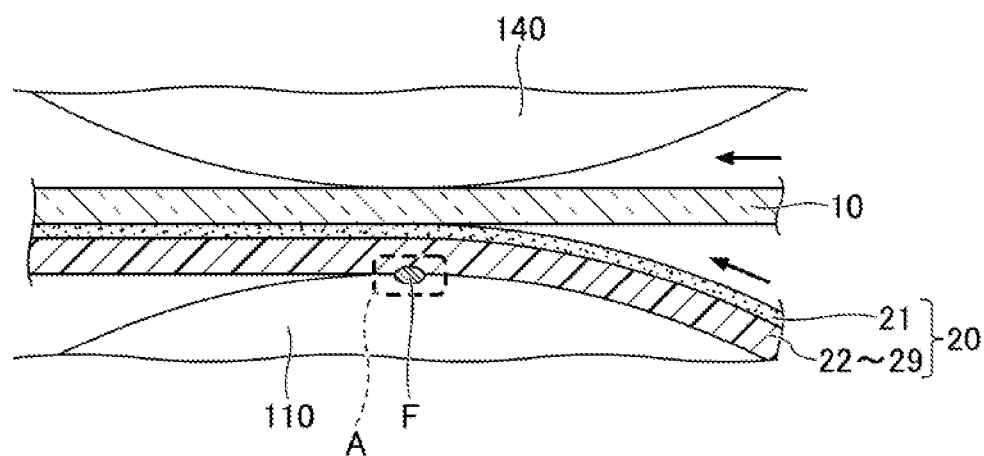
FIG. 4 is a diagram for explaining a method of suppressing generation of bubble defects.

FIG. 4 is a diagram for explaining the method of suppressing the generation of the bubble defects. FIG. 4 shows a vicinity of the contact point of the rollers 110 and 140 shown in FIG. 2 in an enlarged manner. As described above with reference to FIG. 3, in the related art, iron rollers have often been used. In the embodiment of the present application, a surface layer of the roller 110 is formed of a material with a lower elastic modulus than that of iron. The surface layer refers to a portion of the roller 110 about 1 mm inward from the surface of the roller 110 towards the center.

The material with a lower elastic modulus than that of iron is not particularly limited. Suitable materials may include, for example, resins such as polyethylene terephthalate (PET), polyethylene (PE), or polypropylene (PP), rubbers such as silicone rubber, urethane rubber, or nitrile rubber. Among them, silicone rubber with excellent flexibility is particularly preferable.

Figure 5:
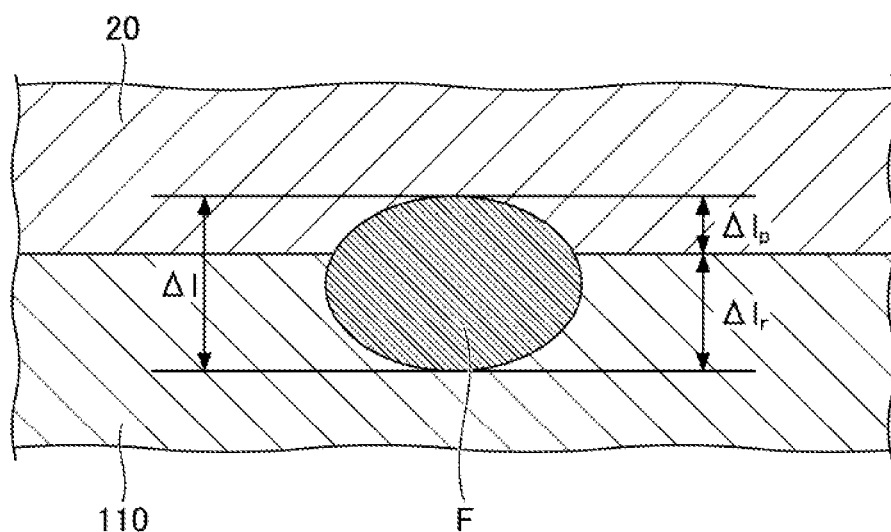
FIG. 5 is an enlarged view of a part "A" in FIG. 4.

FIG. 5 is an enlarged view of the portion "A" shown in FIG. 4. In FIG. 5, according to the presence of the foreign substance F, the resin film 20 and the surface layers of the roller 110 are deformed.

In the following, a length of the foreign substance F before the compression in the direction orthogonal to the surface of the resin film 20 is denoted by t. Then, the length of the foreign substance F after the compression is assumed to be $\Delta l = \sqrt{t}$, considering the compression when the glass film 10 is laminated on the resin film 20. The above-described relation is from the inventors' knowledge based on their experiences.

Moreover, of the length $\Delta l$ of the foreign substance F, the length of the foreign substance F of the resin film 20 side is denoted by $\Delta lp$, and the length of the foreign substance F of the roller 110 side is denoted by $\Delta lr$. Then, from the relation between deformations on both sides of the foreign substance F and the elastic moduli, the following equation (1) can be derived.

[Math 1]

$$Er/Ep = lp/lr \qquad (1)$$

where Ep is the elastic modulus of the resin film 20 and Er is the elastic modulus of the surface layer of the roller 110.

Moreover, from the above-discussion, relation among Δlp, Δlr, Δl, and √t is expressed by the following equation (2).

[Math 2]

$$\Delta lP + \Delta lr = \Delta l = \sqrt{t} \qquad (2)$$

Specific numerical examples will be examined using the equation (1) and the equation (2). The foreign substance F to be a target here has a length t before the compression which is within a range from 20 μm to 100 μm. This is because when the foreign substance F of the above-described size is present, the bubble defect B that can be recognized is easily generated. In the following, the length t is set to be 100 μm as an example.

In the case where polyethylene terephthalate (PET) is used for the material of the surface layer of the roller 110, the elastic modulus is about 5 GPa. The elastic modulus of the resin film 20 is also about 5 GPa. Then, the length Δlp obtained by using the equations (1) and (2) is 5 μm. That is, the foreign substance F enters the resin film 20 by about 5 μm. At this stage, because the uncured adhesive layer 21 has high flexibility, if the thickness of the adhesive layer 21 is greater than or equal to 5 μm, the adhesive layer 21 absorbs the entering of the foreign substance F by Δlp, and as shown in FIG. 4, the surface of the resin film 20 of the side in contact with the glass film 10 is not deformed. That is, the bubble defect B as shown in FIG. 3 does not occur.

Moreover, in the case where silicone rubber is used for the material of the surface layer of the roller 110, the elastic modulus is about 1.5 MPa. Because the elastic modulus of the resin film 20 is about 5 GPa, the length Δlp obtained by using the equations (1) and (2) is $3.0 \times 10^{-3}$ μm. That is, the foreign substance F enters the resin film 20 by about $3.0 \times 10^{-3}$ μm (does not appreciably enter). At this stage, because the resin layer 20 is not deformed, even if the adhesive layer 21 is thin, the surface of the resin film 20 of the side in contact with the glass film 10 is not deformed. That is, the bubble defect B as shown in FIG. 3 does not occur.

That is, when the glass film 10 is laminated on the resin film 20 having the elastic modulus of about 5 GPa provided with the adhesive layer 21 having a thickness of 5 μm or less, the surface layer of the roller 110 is preferably formed of a material having a relatively low elastic modulus, such as polyethylene terephthalate (PET) or silicone rubber. Thus, even when a foreign substance F adheres to the surface of the roller 110, it is possible to suppress deformation of the resin film 20 and generation of the bubble defects B.

As described above, when the elastic modulus of the surface layer of the roller 110 is low, the contribution to the deformation of the resin film 20 by the foreign substance F is small, and the generation of the bubble defect B can be suppressed. Moreover, if the deformation of the resin film 20 by the foreign substance F is small, the contribution from the adhesive layer 21 to relieve the deformation is also small. Thus, a thinner adhesive layer 21 can be used.

The above-described discussion will be shown more generally. The material of the surface layer of the roller 110 may be selected so that a relation $3 \times 10^{-3} \leq P1/P2 \leq 1.0$ is satisfied where P1 is the elastic modulus of the surface layer of the roller 110 and P2 is the elastic modulus of the resin film 20 in the manufacturing process of the glass resin laminated body. In the roller 110, a portion other than the surface layer may be formed of the same material of the surface layer.

The above-described requirements provide greater effects, as the adhesive layer by which the glass film is stuck on the resin film becomes thinner. For example, when the thickness of the adhesive layer is greater than or equal to 0.1 μm and less than or equal to 5 μm, a remarkable effect is exhibited. In other words, in the case of using the adhesive layer with a thickness of greater than 10 μm, it may be possible to suppress the generation of bubble defects B even if the above-described requirements are not satisfied. However, when the adhesive layer becomes thick, there are problems that the conveyance property for the resin film may be degraded, that the curing time for the adhesive layer may be prolonged, and the like. Thus, it is not preferable that the thickness of the adhesive layer is greater than or equal to 10 μm.

In the above-described discussion, the roller 140 has not been mentioned. Because the glass film 10 has high rigidity and is not deformed, the material of the surface layer of the roller 140 is not considered to affect the above-described discussion. Thus, the material of the surface layer of the roller 140 may be iron, resin, rubber, or the like.

In the following, the lamination of the resin film and the glass film will be described more specifically with reference to practical examples and comparative examples. However, the present invention is not limited to the examples.

Example 1

In Example 1, a resin film having an elastic modulus of 5 GPa provided with an adhesive layer having a thickness of 2 μm was prepared. A glass film was laminated on the resin film between rollers that faced each other in the vertical direction. Thereafter, the adhesive layer was cured, and a glass resin laminated body A was prepared. For the surface layer of the roller in contact with the resin film, polyethylene terephthalate (PET) with an elastic modulus of 5 GPa was used.

Example 2

In Example 2, a glass resin laminated body B was prepared in the same manner as Example 1, except that the thickness of the adhesive layer was set to 5 μm.

Example 3

In Example 3, a glass resin laminated body C was prepared in the same manner as Example 1, except that the thickness of the adhesive layer was set to 10 μm.

Comparative Example 1

In the Comparative example 1, a resin film having an elastic modulus of 5 GPa provided with an adhesive layer having a thickness of 2 μm was prepared. A glass film was laminated on the resin film between rollers that faced each other in the vertical direction. Thereafter, the adhesive layer was cured, and a glass resin laminated body D was prepared. For the surface resin of the roller in contact with the resin film, iron having an elastic modulus of 73 GPa was used.

Comparative Example 2

In the Comparative example 2, a glass resin laminated body E was prepared in the same manner as Comparative example 1, except that the thickness of the adhesive layer was set to 5 μm.

Comparative Example 3

In the Comparative example 3, a glass resin laminated body F was prepared in the same manner as Comparative example 1, except that the thickness of the adhesive layer was set to 10 μm.

[Evaluation]

For the glass resin laminated bodies A to F, prepared in Examples 1 to 3 and Comparative examples 1 to 3, numbers of bubble defects were visually checked. TABLE 1 and TABLE 2 show results of the evaluation. The evaluation was determined to be "A" (pass) if the number of bubble defects [/m$^2$] was 50 or less, or "B" (failure) if the number of bubble defects [/m$^2$] was greater than 50.

TABLE 1

|  | Example 1 | Example 2 | Example 3 |
|---|---|---|---|
| Thickness of adhesive layer | 2 μm | 5 μm | 10 μm |
| Material of surface layer of roller (elastic modulus) | PET (5 GPa) | PET (5 GPa) | PET (5 GPa) |
| Number of bubble defects [/m$^2$] | 40 | 0 | 0 |
| Evaluation | A | A | A |

TABLE 2

|  | Comparative example 1 | Comparative example 2 | Comparative example 3 |
|---|---|---|---|
| Thickness of adhesive layer | 2 μm | 5 μm | 10 μm |
| Material of surface layer of roller (elastic modulus) | Iron (73 GPa) | Iron (73 GPa) | Iron (73 GPa) |
| Number of bubble defects [/m$^2$] | 208 | 112 | 0 |
| Evaluation | B | B | A |

As shown in TABLE 1, when the surface layer of the roller in contact with the resin film was formed of polyethylene terephthalate (PET), the number of bubble defects was within an allowable range for any of the thicknesses of the adhesive layer of 2 μm, 5 μm, and 10 μm. In particular, when the thickness of the adhesive layer was greater than or equal to 5 μm, bubble defects were not observed and the results were very favorable.

From the above-described results of discussion, it is expected that when the surface layer of the roller in contact with the resin film is formed of silicone rubber, the number of bubble defects can be reduced to almost zero even if the thickness of the adhesive layer is 2 μm or less.

On the other hand, as shown in TABLE 2, when iron is used for the surface layer of the roller in contact with the resin film, although the number of bubble defects in the case where the thickness of the adhesive layer is 10 μm is zero, the number of bubble defects in the case where the thickness of the adhesive layer is 2 μm and the number of bubble defects in the case where the thickness of the adhesive layer is 5 μm exceed the allowable range. That is, when a thin adhesive layer having a thickness of 5 μm or less is used, it is necessary to use polyethylene terephthalate (PET) or a material having an elastic modulus that is lower than that of the polyethylene terephthalate (silicone rubber or the like) for the surface layer of the roller in contact with the resin film.

As described above, from the results of Examples and Comparative examples, it is confirmed that when the material of the surface layer of the roller in contact with the resin film is selected so that the relation $3 \times 10^{-3} \leq P1/P2 \leq 1.0$ is satisfied where P1 is the elastic modulus of the surface layer of the roller in contact with the resin film and P2 is the elastic modulus of the resin film in the manufacturing process of the glass resin laminated body, it is possible to suppress generation of bubble defects.

Moreover, it is confirmed that the above-described requirements provide greater effects, as the adhesive layer by which the glass film is stuck on the resin film becomes thinner, and a remarkable effect is exhibited when the thickness of the adhesive layer is 5 μm or less.

In the above description, a resin film having a polarizing plate has been explained as an example. However, the above-described requirements are effective for a method of manufacturing a glass resin laminated body including a step of sticking a glass film on a resin film via an adhesive layer using two rollers facing each other, and are not limited to the resin film having a polarizing plate. Examples other than the resin film having a polarizing plate include, for example, a PET film or a PEN film.

As described above, preferred embodiments or the like have been described in detail. The present invention is not limited to the above-described embodiments or the like, but various modifications and replacements may be made for the above-described embodiments without departing from the scope of the present invention.

The present application claims the priority based on Japanese Patent Application No. 2019-066162 filed with the Japan Patent Office on Mar. 29, 2019, and the entire content of Japanese Patent Application No. 2019-066162 is incorporated herein by reference.

REFERENCE SIGNS LIST

1 Glass resin laminated body
10 Glass film
20 Resin film
21 Adhesive layer
22 Polarizing plate
28 Gluing agent layer
29 Release film
110, 120, 130, 140 Roller
221 Polarizer
222 First protection film
223 Second protection film

The invention claimed is:
1. A method of manufacturing a glass resin laminated body comprising: a step of sticking a glass film on a resin film via an adhesive layer while holding the glass film and resin film between a first roller that presses against the resin film and a second roller that is disposed opposite to the first roller and that presses against the glass film, wherein a thickness of the adhesive layer is less than or equal to 5 μm, a ratio of an elastic modulus P1 of a surface layer of the first roller to an elastic modulus P2 of the resin film P1/P2 satisfies a relation of $3\times10^{-3} \leq P1/P2 \leq 1.0$, the surface layer of the first roller is formed of a material having an elastic modulus that is lower than the elastic modulus of iron, the surface layer of the first roller is a portion of the first roller 1 mm inward from a surface of the first roller towards a center; and the surface layer of the first roller is formed of a resin from a group consisting of polyethylene terephthalate, polyethylene, or polypropylene.

2. The method of manufacturing a glass resin laminating body according to claim 1, wherein
   the resin film includes a polarizing plate disposed on an opposite side of the adhesive layer with respect to the glass film.

3. The method of manufacturing a glass resin laminating body according to claim 2, wherein
   the polarizing plate includes a polarizer and a protection film.

\* \* \* \* \*